(12) United States Patent
Haseltine et al.

(10) Patent No.: US 12,386,177 B2
(45) Date of Patent: Aug. 12, 2025

(54) COMPACT AUGMENTED REALITY / VIRTUAL REALITY DISPLAY

(71) Applicant: Disney Enterprises, Inc., Burbank, CA (US)

(72) Inventors: Eric C. Haseltine, Silver Spring, MD (US); Joseph L. Olson, Pasadena, CA (US); Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 83 days.

(21) Appl. No.: 16/597,029

(22) Filed: Oct. 9, 2019

(65) Prior Publication Data

US 2020/0041800 A1 Feb. 6, 2020

Related U.S. Application Data

(62) Division of application No. 15/366,884, filed on Dec. 1, 2016, now Pat. No. 10,459,230.

(Continued)

(51) Int. Cl.
*G02B 27/01* (2006.01)
*G02B 5/30* (2006.01)
(Continued)

(52) U.S. Cl.
CPC ........... *G02B 27/0172* (2013.01); *G02B 5/30* (2013.01); *G02B 5/3083* (2013.01); *G02B 9/06* (2013.01);
(Continued)

(58) Field of Classification Search
CPC .... G02B 27/0172; G02B 5/30; G02B 27/017; G02B 27/0176; G02B 5/3085;
(Continued)

(56) References Cited

U.S. PATENT DOCUMENTS 4,652,870 A * 3/1987 Steward ............. G02B 27/0101
359/633
4,709,144 A * 11/1987 Vincent ................ G02B 27/148
250/226

(Continued)

FOREIGN PATENT DOCUMENTS

CN 104062769 A 9/2014
CN 203858416 U 10/2014
(Continued)

OTHER PUBLICATIONS

Quibian Salazar-Moreno, "Hands On: Adr1ft is a Tense First Person Experience in Outer Space," Pax East 2015, Mar. 10, 2015, 8 pages.

(Continued)

*Primary Examiner* — Zachary W Wilkes
(74) *Attorney, Agent, or Firm* — Patterson + Sheridan, LLP; Gero G. McClellan

(57) ABSTRACT

Implementations of an augmented reality (AR)-capable display device for displaying light generated by a display onto a predefined field of view are disclosed herein. Within one implementation, the display device comprises a mount assembly configured to removably attach with a mobile computing device associated with the display, to thereby arrange the display with a predefined position. The display device further comprises an optical arrangement having a predefined arrangement relative to the predefined position and defining the field of view. The optical arrangement comprises a first mirror element configured to reflect a first portion of first incident light that is based on the light generated by the display, and a second mirror element disposed within the field of view and configured to reflect, onto the field of view, a second portion of second incident light that is based on the first portion.

18 Claims, 8 Drawing Sheets

Related U.S. Application Data

(60) Provisional application No. 62/290,292, filed on Feb. 2, 2016.

(51) Int. Cl.
| | |
|---|---|
| *G02B 9/06* | (2006.01) |
| *G02B 9/10* | (2006.01) |
| *G02B 27/28* | (2006.01) |
| *G06T 19/00* | (2011.01) |

(52) U.S. Cl.
CPC ............ *G02B 9/10* (2013.01); *G02B 27/017* (2013.01); *G02B 27/0176* (2013.01); *G02B 27/283* (2013.01); *G06T 19/006* (2013.01); *G02B 2027/0123* (2013.01); *G02B 2027/0138* (2013.01); *G02B 2027/014* (2013.01)

(58) Field of Classification Search
CPC .......... G02B 27/283; G02B 2027/0138; G02B 2027/014; G02B 2027/0123
USPC .................................................. 359/630, 633
See application file for complete search history.

(56) References Cited

U.S. PATENT DOCUMENTS

| | | | |
|---|---|---|---|
| 5,831,712 A | 11/1998 | Tabata et al. | |
| 5,886,822 A | 3/1999 | Spitzer | |
| 5,903,396 A * | 5/1999 | Rallison | G02B 27/0101 |
| | | | 359/13 |
| 5,913,591 A | 6/1999 | Melville | |
| 5,991,103 A * | 11/1999 | Togino | G02B 17/0816 |
| | | | 359/834 |
| 6,342,871 B1 * | 1/2002 | Takeyama | G02B 27/0172 |
| | | | 359/630 |
| 7,379,247 B2 | 5/2008 | Goto | |
| 7,639,208 B1 | 12/2009 | Ha et al. | |
| 8,957,835 B2 * | 2/2015 | Hoellwarth | G02B 27/0172 |
| | | | 345/8 |
| 9,091,851 B2 * | 7/2015 | Border | G02B 27/0172 |
| 9,164,281 B2 | 10/2015 | Hing et al. | |
| 9,922,464 B2 | 3/2018 | Haseltine et al. | |
| 9,996,984 B2 | 6/2018 | Haseltine et al. | |
| 10,001,648 B2 | 6/2018 | Smithwick | |
| 2003/0030912 A1 | 2/2003 | Gleckman et al. | |
| 2004/0145814 A1 * | 7/2004 | Rogers | G02B 27/283 |
| | | | 359/634 |
| 2007/0292832 A1 | 12/2007 | Doyle et al. | |
| 2010/0079356 A1 * | 4/2010 | Hoellwarth | G02B 27/0172 |
| | | | 345/8 |
| 2011/0075257 A1 | 3/2011 | Hua et al. | |
| 2011/0169928 A1 | 7/2011 | Gassel et al. | |
| 2012/0313839 A1 | 12/2012 | Smithwick et al. | |
| 2013/0113701 A1 | 5/2013 | Sasaki et al. | |
| 2013/0200157 A1 | 8/2013 | Nunnink et al. | |
| 2013/0208014 A1 | 8/2013 | Fleck et al. | |
| 2013/0313839 A1 | 11/2013 | Abe et al. | |
| 2014/0009462 A1 | 1/2014 | McNamer et al. | |
| 2014/0112651 A1 | 4/2014 | Sato | |
| 2014/0118836 A1 | 5/2014 | Amitai et al. | |
| 2014/0126056 A1 | 5/2014 | Amitai et al. | |
| 2014/0152531 A1 | 6/2014 | Murray et al. | |
| 2014/0177023 A1 | 6/2014 | Gao et al. | |
| 2014/0274391 A1 | 9/2014 | Stafford | |
| 2015/0070596 A1 * | 3/2015 | Gadjali | G02B 27/0172 |
| | | | 359/630 |
| 2015/0309316 A1 * | 10/2015 | Osterhout et al. | G06F 1/163 |
| 2016/0154244 A1 * | 6/2016 | Border | G02B 27/0172 |
| | | | 359/630 |
| 2016/0247319 A1 | 8/2016 | Nowatzyk et al. | |
| 2016/0349509 A1 * | 12/2016 | Lanier | G02B 27/0172 |
| 2016/0363770 A1 | 12/2016 | Kim et al. | |
| 2017/0052373 A1 | 2/2017 | Memmott et al. | |
| 2017/0154464 A1 | 6/2017 | Lanier et al. | |
| 2017/0185037 A1 | 6/2017 | Lee et al. | |
| 2017/0219826 A1 | 8/2017 | Haseltine et al. | |
| 2018/0090002 A1 | 3/2018 | Arita et al. | |
| 2018/0247464 A1 | 8/2018 | Haseltine et al. | |
| 2019/0088021 A1 | 3/2019 | Tanaka et al. | |

FOREIGN PATENT DOCUMENTS

| | | | |
|---|---|---|---|
| CN | 104216118 A | | 12/2014 |
| CN | 104414747 A | | 3/2015 |
| CN | 104903777 A | | 9/2015 |
| CN | 104937475 A | | 9/2015 |
| CN | 105259655 A | | 1/2016 |
| CN | 204989624 U | | 1/2016 |
| GB | 2499102 | * | 8/2013 |
| WO | 2014011266 A2 | | 1/2014 |

OTHER PUBLICATIONS

Chinese Office Action for Application No. 201710063959.3 dated Oct. 22, 2018.
Choi et al "Paraxial ray optics cloaking", 2014 Optical Express, vol. 22. No. 24, 14 pages.
Kiyokaw et al. "ELMO: An Enhanced Optical See-Through Display Using an LCD Panel for Mutual Occulsion", downloaded from <http://lab.ime.cmc.osaka-u.ac.jp/~kiyo/cr/kiyokawa-2001-03-ISMR2001/kiyokawa-2001-03-ISMR2001.pdf> on Apr. 4, 2016, pp. 1-2.
Kiyokawa et al. "An Occlusion-Capable Optical See-through Head Mount Display for Supporting Co-located Collaboration" 2003 IEEE, 9 pages.
Kiyokawa et al., "An opitcal see-through display for mutual occlusion with real-time stereovision system," Computers & Graphics 25 (2001) 765-779.
Swift, "Image Rotation Devices—A comparative survey", Optics Lasers and Technology, pp. 175-188, 1972.
Ozan Cakmakci, Yonggang Ha and Jannick P. Rolland, "A Compact Optical See-through Head-Worn Display with Occlusion Support," Conference Paper—Jan. 2004, 11 pages.
Ozan Cakmakci, Yonggang Ha and Jannick Rolland, "Design of a compact optical see-through head-worn display with mutual occlusion capability," University of Florida, Aug. 19, 2005, 6 pages.
Chinese Office Action for Application No. 20171032376.3 dated Mar. 2, 2020.
Chinese Office Action for Application No. 201911118444.4 dated May 25, 2021.
Chinese Patent Office, Second Office Action for Chinese Patent Application No. 201911118444.4, dated Oct. 31, 2024.

* cited by examiner

COMPACT AUGMENTED REALITY / VIRTUAL REALITY DISPLAY

CROSS-REFERENCE TO RELATED APPLICATIONS

This application is a divisional of co-pending U.S. patent application Ser. No. 15/366,884 filed Dec. 1, 2016, which claims benefit of U.S. provisional patent application Ser. No. 62/290,292 filed Feb. 2, 2016. Each of the aforementioned related patent applications is herein incorporated by reference in its entirety.

BACKGROUND

Field of the Disclosure

The present disclosure generally relates to computer-based entertainment, and more specifically to optical arrangements suitable for augmented reality (AR) and/or virtual reality (VR) display devices.

Description of the Related Art

Computer graphics technology has significantly progressed since the first video games were developed. Relatively inexpensive 3D graphics engines now provide nearly photo-realistic interactive game play on hand-held video game, home video game, and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of visual sensing device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

One embodiment described herein is an augmented reality (AR)-capable display device for displaying light generated by a display onto a predefined field of view. The display device comprises an optical arrangement having a predefined arrangement relative to a predefined position of the display and defining the field of view. The optical arrangement comprises a beam splitter element disposed within the field of view and configured to transmit a first portion of first incident light that is based on the light generated by the display, and a first mirror element configured to reflect, toward the beam splitter element, a second portion of second incident light that is based on the first portion. The beam splitter element is further configured to reflect, onto the field of view, a third portion of third incident light that is based on the second portion.

Another embodiment described herein is an augmented reality (AR)-capable display device for displaying light generated by a display onto a predefined field of view. The display device comprises an optical arrangement having a predefined arrangement relative to a predefined position of the display and defining the field of view. The optical arrangement comprises a first mirror element configured to reflect a first portion of first incident light that is based on the light generated by the display, and a second mirror element disposed within the field of view and configured to reflect, onto the field of view, a second portion of second incident light that is based on the first portion.

Another embodiment described herein is an augmented reality (AR)-capable display device for displaying light generated by a display onto a predefined field of view. The display device comprises an optically transmissive display disposed within the field of view and a first lens element disposed within the field of view on a first side of the optically transmissive display, the first lens element having a positive optical power. The display device further comprises a second lens element disposed within the field of view on a second side of the optically transmissive display opposite the first side, the second lens element having a negative optical power equal in magnitude to the positive optical power.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclosure and are therefore not to be considered limiting of its scope, for the disclosure may admit to other equally effective embodiments.

DETAILED DESCRIPTION

Various implementations for a compact AR/VR display device are disclosed herein. It is generally beneficial to design a compact AR/VR display device to have a relatively small size and weight, which allows for use by younger users or other users with reduced strength, and which is generally less fatiguing during use. A compact implementation tends to reduce manufacturing costs through reduced material and process requirements, and may also be more aesthetically pleasing for users, when compared with a large or bulky display device.

Implementations of a compact AR/VR display device may use dedicated hardware and/or may use a smartphone or other mobile computing device. For example, implementations able to adapt the viewer's smartphone can provide a reduced manufacturing cost of the compact AR/VR display device, as no separate computing hardware or display hardware need be included. Using the viewer's own smartphone may also provide increased convenience to the viewer, and may provide a relatively large display for viewing.

Within the compact AR/VR display device, the positioning of the mobile computing device and/or an optical arrangement can also be advantageously selected to reduce a moment on the viewer (e.g., corresponding to strain on the neck or upper body). For example, in a head-worn compact AR/VR display device, positioning a smartphone closer to the viewer's head provides a smaller moment.

Figure 1:
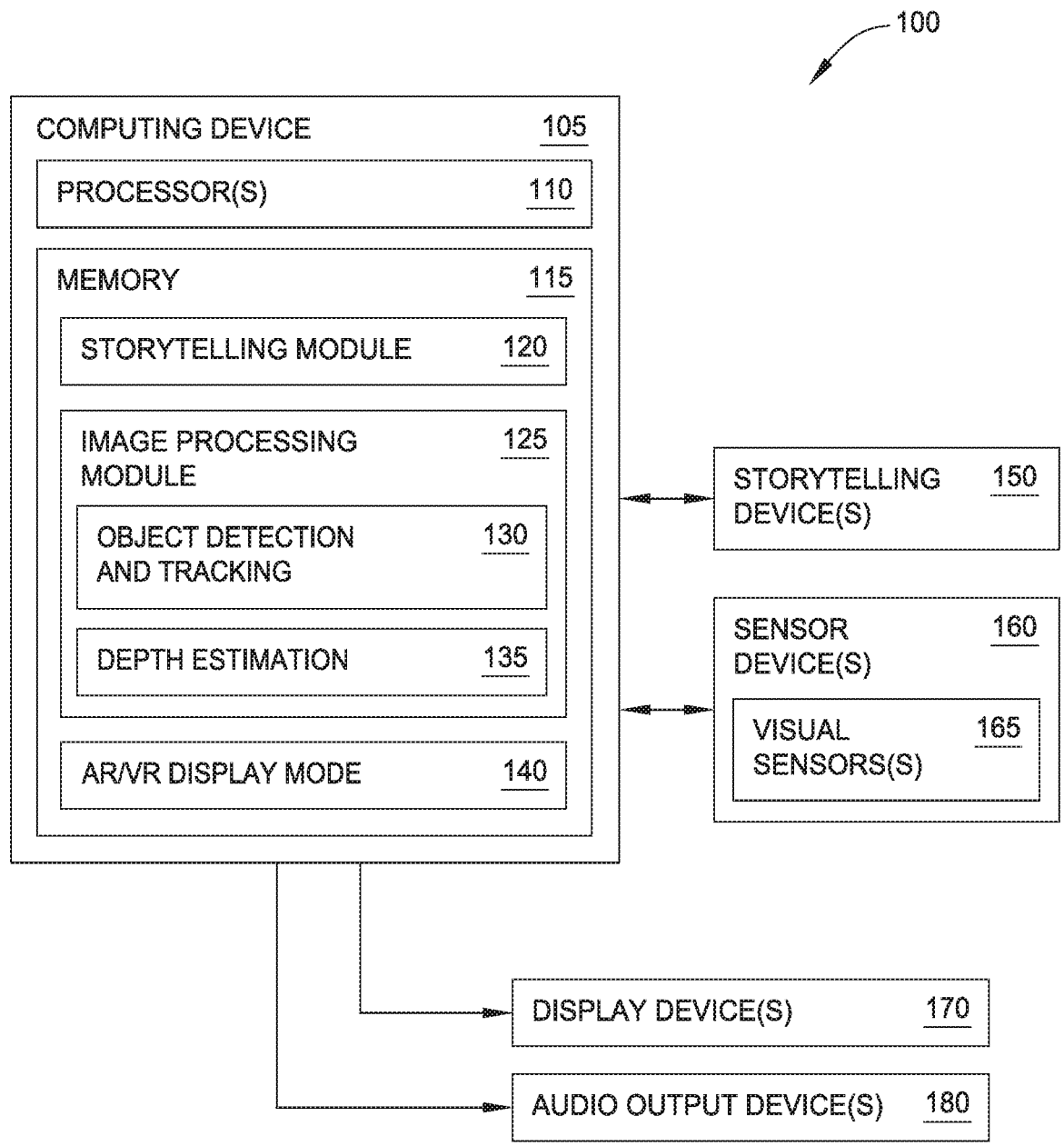
FIG. 1 illustrates an exemplary interactive environment, according to one embodiment.

FIG. 1 illustrates an exemplary interactive environment, according to one embodiment. Within a system 100, a computing device 105 communicates with one or more storytelling devices 150, one or more sensor devices 160, one or more display devices 170, and one or more audio output devices 180. As will be discussed in greater detail below, the computing device 105 may provide an augmented reality (AR) and/or virtual reality (VR) display functionality for a user in the interactive environment. The computing device 105 may be embodied in any suitable form. In some embodiments, the computing device 105 is a body-worn computing device, e.g., integrated into an assembly worn on the head, arm, etc. of a user. In some embodiments, the computing device 105 comprises a mobile computing device, such as a smartphone, tablet, etc. The mobile computing device may be configured to physically and removably attach with a body-worn assembly.

Computing device 105 comprises, without limitation, a processor 110 and memory 115. The processor 110 generally retrieves and executes programming instructions stored in the memory 115. Processor 110 is included to be representative of a single central processing unit (CPU), multiple CPUs, a single CPU having multiple processing cores, graphics processing units (GPUs) having multiple execution paths, and the like. The memory 115 is generally included to be representative of a random access memory, but may further include non-volatile storage of any suitable type(s).

Memory 115 generally includes program code for performing various functions related to generating and maintaining the storytelling environment. The program code is generally described as various functional "modules" within memory 115, although alternate implementations may have different functions and/or combinations of functions. Within memory 115, a storytelling module 120 is generally configured to generate a story using a selected predetermined story template (e.g., stored in memory 115), and based on a number of identified storytelling devices 150 that are available for participating in the storytelling experience. The storytelling devices 150 can be identified using a registration process performed by any suitable methods of communication. One non-limiting example includes a controller device (which may be a storytelling device 150 or the computing device 105) emitting a first signal such as an infrared (IR) signal, and other storytelling devices 150 transmitting a response signal such as a radio frequency (RF) signal in response to receiving the first signal.

The sensor devices 160 may be of any suitable type(s) and configured to sense information regarding the storytelling environment. Some non-limiting examples of sensor devices 160 include visual sensors 165, pressure sensors, acceleration sensors, and temperature sensors. The visual sensors 165 can include cameras configured to sense visible light and/or infrared light. In some embodiments, the sensor devices 160 may be included with (or within) the computing device 105. For example, where the computing device 105 is a smartphone or tablet device, the sensor devices 160 may include camera(s), inertial motion units (IMUs), etc. that included within the smartphone/tablet device. In some embodiments, the sensor devices 160 comprise sensors that are external to the computing device 105, e.g., a visual sensor 165 included with a head-worn device.

The memory 115 further includes an image processing module 125 configured to perform processing of visual information captured by visual sensors 165. The image processing module 125 may include any number of image processing functions, such as an object detection and tracking sub-module 130 configured to detect physical objects within the interactive environment (e.g., based on edge detection information, color information, and/or other suitable features) and to track the relative location of detected objects over time (e.g., as a user and/or the objects move throughout the interactive environment). The image processing module 125 further includes a depth estimation sub-module 135 configured to dynamically estimate a distance of the detected objects from the user.

The system 100 includes one or more display devices 170, and one or more audio output devices 180. The display devices 170 may include visual displays of any suitable type. The display devices 170 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. In some embodiments, the display devices 170 are included within the computing device 105 (e.g., a main display screen of the smartphone, tablet device, etc.). In other embodiments, the display devices 170 are separate from the computing device 105 but are configured to superimpose virtual imagery onto physical objects in the user's field of view. For example, the display devices 170 may be integrated into a body-worn device such as a headset, and the display devices 170 may be configured as an eyepiece or lens worn in front of the user's eye. In another example, the display devices 170 may be integrated into other devices that are carried or handled by the user, or having any other suitable user interaction during the storytelling experience. For example, while participating in the storytelling experience, the user can carry a toy blaster that includes an optical sight for aiming, and the display devices 170 may be integrated in the optical sight.

The audio output devices 180 may include conventional audio speakers having any suitable form factor (e.g., standalone, integrated in a stereo, headphones, etc.), as well as devices using alternative methods of producing sound perceptible by a user, such as bone conduction transducers in a body-worn device. In some embodiments, the audio output devices 180 are included within the computing device 105 (e.g., speakers of the smartphone, tablet device, etc.). In other embodiments, the audio output devices 180 are separate from the computing device 105.

In some embodiments, the computing device 105 is configured to operate in an augmented reality (AR) mode, generally configured to superimpose virtual images such as characters, objects, and/or dynamic visual effects into the user's natural field of view of the environment using a display device 170. The field of view of the user is generally determined using sensor devices 160 such as the visual sensors 165. In some embodiments, the computing device 105 is configured to operate in a virtual reality (VR) mode, generally replacing the user's natural field of view of the environment with virtual imagery using display device 170.

For example, the display device 170 could superimpose a virtual character to appear seated on a physical chair detected within the environment. The display of the virtual character on the display device 170 is dynamically adjusted based on the user's field of view (orientation), the determined depth of the chair from the user, and so forth.

In some embodiments, the computing device 105 is configured to dynamically select one of the AR mode and VR mode based on the sensed characteristics of the environment and/or based on the story generated by the storytelling module. The selection of the AR or VR modes is represented as AR/VR display mode 140 and included in memory 115. For example, the visual sensors 165 may detect that the environment is extremely bright (e.g., when the user is in direct sunlight), which may be difficult for a user to view overlaid information using the display device 170. In another example, a virtual setting of the story generated by the storytelling module 120 specifies a nighttime setting. In these examples, the VR mode may be enabled in order to substantially isolate the user's field of view from the surrounding physical environment and thereby reduce the amount of light received from the environment. In both cases, dynamic selection of the AR/VR display mode 140 can improve the immersive nature of the storytelling environment, whether through ensuring the user is able to suitably view the overlaid information or through providing a more realistic setting consistent with the virtual setting of the story.

Switching between AR and VR modes may be accomplished through any suitable techniques. In some embodiments, a user-worn headset includes a light-blocking assembly comprising cross polarizers that are disposed in front of each of the user's eyes. When one or both of the cross polarizers are rotated, the light from the physical environment that is transmitted to the user's eyes can be selectively reduced, and can substantially isolate the user's field of view from the physical environment (e.g., a VR mode). Rotating the cross polarizers may be performed manually (e.g., the user turns a knob linked with the cross polarizers), or electronically (e.g., a motor receives control signals from computing device 105 based on the AR/VR display mode 140 and rotates the cross polarizers. In other embodiments, the light-blocking assembly includes a partially or fully transparent "see-through" display, such as an OLED or side-lit or naturally lit LCD. The display receives control signals from computing device 105 based on the AR/VR display mode 140 and can selectively darken the display to substantially isolate the user's field of view from the physical environment.

The display devices 170 are generally used within system 100 to provide a compact AR/VR display that may be carried or worn by the user during the storytelling experience. As discussed above, the display devices 170 may include devices that are separate from the display device of a mobile computing device (e.g., a smartphone or tablet device). Implementations of the compact AR/VR display that use a smartphone or other mobile computing device offer several advantages. For example, implementations able to adapt the user's smartphone provide a reduced manufacturing cost of the compact AR/VR display, as no separate computing hardware or display hardware need be included. A camera included in the smartphone may be used as visual sensor 165 to dynamically provide information regarding the physical environment and the user's field of view. Using a smartphone may also provide increased convenience to the user, and may provide a relatively large display for viewing.

A number of considerations influence the design of a compact AR/VR display that uses a mobile computing device. Generally, the compact AR/VR display includes an optical arrangement that is configured to transmit some or all of the display of the mobile computing device to the user's eyes. Depending on the currently selected mode (AR or VR), the optical arrangement is further configured to transmit some or all of the light from the physical environment to the user's eyes. It may be beneficial to design a compact AR/VR display to have a relatively small size and weight. Smaller and lighter body-worn implementations allow for use by younger users or other users with reduced size and/or strength, and are generally less fatiguing during storytelling experience. The positioning of the mobile computing device and/or the optical arrangement can also be selected to reduce a moment on the user. For example, in a head-worn compact AR/VR display, including a smartphone in a position closer to the user's head provides a smaller moment (e.g., corresponding to strain on the neck or upper body) than an implementation in which the smartphone is positioned further from the user's head. A compact (small-sized) implementation also reduces manufacturing costs through reduced material and process requirements. A compact implementation may also be more aesthetically pleasing for users, when compared with a large or bulky implementation.

Using a mobile computing device in conjunction with an optical arrangement can provide the user a reasonably good field of view, which enhances the immersive nature of the interactive environment. Generally, the size of the user's field of view is proportional to size of the elements included in the optical arrangement for a particular distance from the user's eyes.

Figure 2:
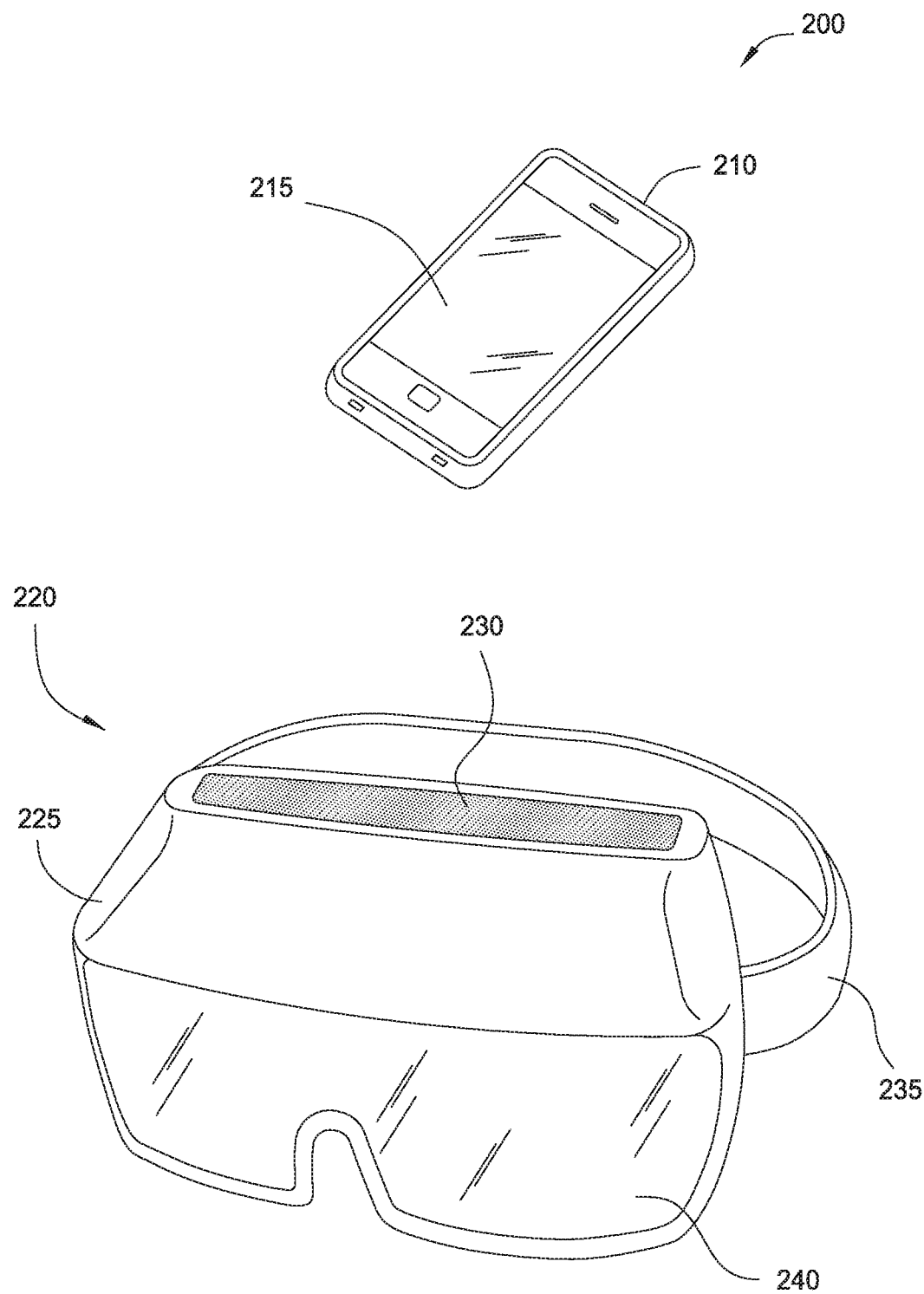
FIG. 2 is a diagram illustrating an AR/VR headset configured to interact with a mobile computing device, according to embodiments described herein.

FIG. 2 is a diagram 200 illustrating an AR/VR headset configured to interact with a mobile computing device, according to embodiments described herein. As shown, the diagram 200 depicts a mobile computing device 210 and an AR/VR-capable display device in the form of an AR/VR headset 220. The AR/VR headset 220 generally includes a mount assembly 225 (or "mobile device adapter"), a headstrap 235, and a mirrored lens 240. The mount assembly 225 defines an opening 230 into which the mobile computing device 210 is received. Generally, insertion of the mobile computing device 210 into the opening 230 provides a removable attachment of the mobile computing device 210 with the mount assembly 225 and further arranges the display 215 (representing an example of the display device 170 of FIG. 1) with a predefined position. In the predefined position, the display 215 has a suitable orientation relative to optical components (not shown) included in the AR/VR headset 220. The mount assembly 225 may include any suitable means for removably attaching the mobile computing device 210. The mount assembly 225 is further configured to hold or retain the mobile computing device 210 with a desired position and orientation relative to a wearer of the AR/VR headset 220.

The light generated by the display 215 of the mobile computing device 210 (e.g., based on display signals) is redirected through the optical components of the AR/VR headset 220 so that the light can be seen by a wearer of the AR/VR headset 220. For example, the generated light could pass through a beam-splitter and reflect off the mirrored lens 240 and into the wearer's eyes. Thus, virtual objects that are displayed using the display 215 appear as if present within the physical environment of the viewer. Advantageously, by leveraging the hardware resources of the mobile computing device 210, the AR/VR headset 220 can be produced and sold at reduced costs, relative to other AR devices containing dedicated computer processors, display devices, and so forth.

Figure 3:
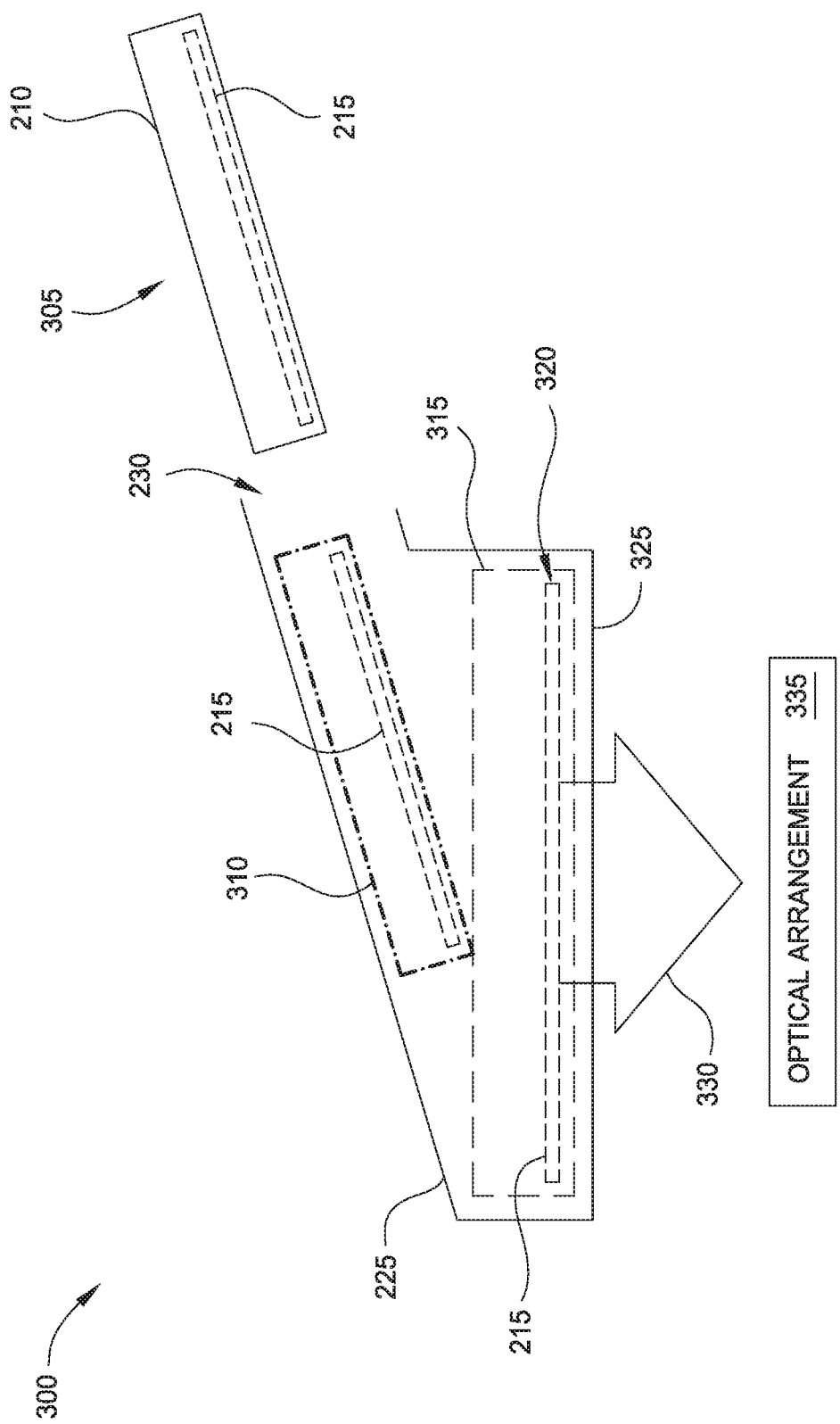
FIG. 3 is a diagram illustrating attachment of a mobile computing device with a mount assembly, according to embodiments described herein.

FIG. 3 is a diagram 300 illustrating attachment of a mobile computing device with a mount assembly, according to embodiments described herein. More specifically, diagram 300 depicts an exemplary sequence for inserting the mobile computing device 210 into the mount assembly 225. The mount assembly 225 may be formed of one or more elements of any material having suitable strength for retaining the mobile computing device 210. In some embodiments, the mount assembly 225 is formed of a plastic material, which advantageously provides a lighter display device.

The mobile computing device 210 is inserted through an opening 230 formed in the mount assembly 225. The intermediate position 310 represents possible positioning of the mobile computing device 210 before reaching a predefined final position 315. At the predefined final position 315 of the mobile computing device 210, the display 215 of the mobile computing device 210 has a predefined position 320 relative to the optical arrangement 335.

A lower surface 325 of the mount assembly 225 is generally optically transmissive of light 330 generated by the display 215. In some embodiments, the lower surface 325 is formed of an optically transmissive material, such as a plastic or glass, through which light 330 from the display 215 is transmitted. In other embodiments, the lower surface 325 defines an opening through which light 330 from the display 215 is transmitted. For example, the lower surface 325 may support the mobile computing device 210 around a periphery of the mobile computing device 210.

Although not explicitly shown, the mount assembly 225 may include further elements for removably attaching the mobile computing device 210 with the mount assembly 225. For example, a press fit may be formed between the mobile computing device 210 and mount assembly 225 using adjustable corner piece(s), a sliding tray with guide plug, toggle pin(s), a stepped slot, a replaceable tray, etc. For example, the mobile computing device 210 may be inserted into a replaceable tray or other suitable carrier member, which is then inserted to the mount assembly 225 to thereby arrange the display 215 with the predefined position 320. In this way, different carrier members may be used to accommodate different types of mobile computing devices 210 for a particular mount assembly 225.

The removable attachment of the mobile computing device 210 with the mount assembly 225 may have any suitable orientation within an associated display device. The elements of the optical arrangement 335 collectively define a field of view relative to a predefined optical reference point, and the display device is generally designed such that the eye(s) of the viewer is aligned with the optical reference point. To support an AR capability of the display device, the mobile computing device 210 and mount assembly 225 are generally disposed outside of the field of view to allow a viewer to observe the physical environment through the optical arrangement 335. For example, for a head-worn display device in which a line of sight of the viewer corresponds to the field of view of the optical arrangement 335, the mobile computing device 210 and mount assembly 225 may be positioned above, below, or to a side of the viewer's line of sight.

Figures 4, 5:
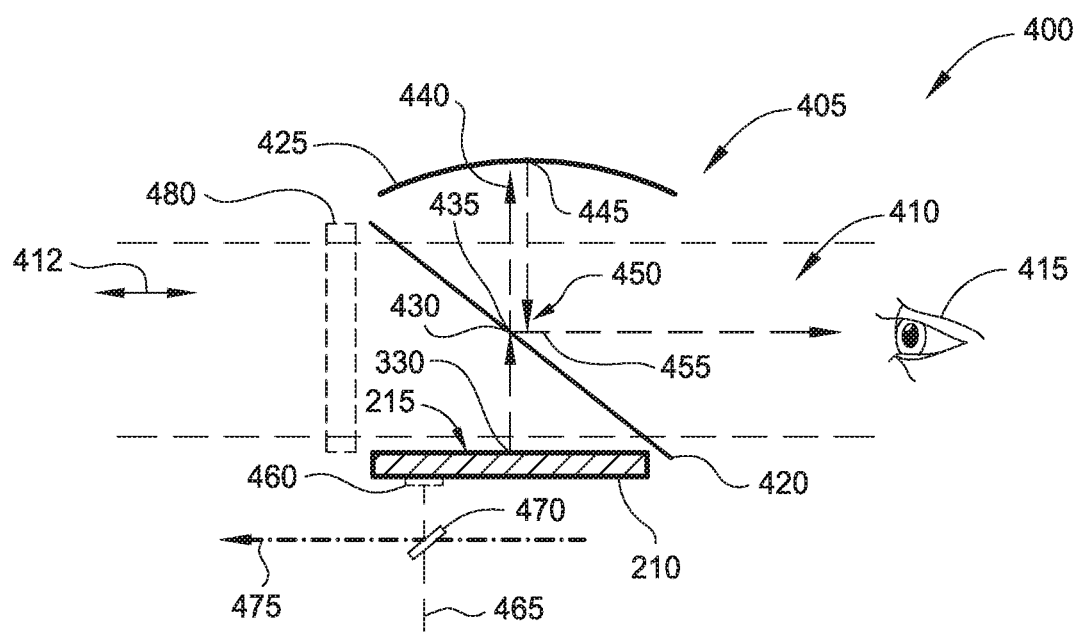
FIGS. 4-11 illustrate exemplary implementations of a compact AR/VR display device, according to various embodiments.

FIG. 4 illustrates an exemplary implementation of a compact AR/VR display device 400, according to one embodiment. The display device 400 illustrates a smartphone (i.e., one example of a mobile computing device 210) and an optical arrangement 405 that is configured to reflect at least a portion of the display 215 of the smartphone to an eye 415 of a viewer. The elements of the optical arrangement 405 collectively define a field of view 410 relative to a predefined optical reference point. The display device 400 is generally designed such that the eye 415 of the viewer is aligned with the optical reference point.

Although not shown, the optical arrangement 405 may include a mask that is configured to block light from some of the display area of display 215 and/or from other portions of the smartphone to prevent these portions from being seen by the viewer. For example, a mask may be provided to prevent the smartphone edges from being visible within the field of view 410, which tends to distract the viewer from the immersive nature of the interactive environment.

As shown, the smartphone is arranged with its display 215 facing in an upward direction. In some embodiments, the smartphone is removably attached with the optical arrangement 405 in the display device 400, which may be body-worn or carried by the viewer. The removable attachment of the smartphone allows its display 215 to maintain a desired orientation with the elements of the optical arrangement 405 despite movement of the viewer during usage. Note that the structural elements attaching portions of the optical arrangement 405, the smartphone, and/or the viewer are not depicted for simplicity. For example, the display device 400 may include a flexible headstrap allowing comfortable wear by the viewer on his or her head. The light 330 (or "imagery") generated by the display 215 is transmitted in the upward direction towards a first mirror element 425. In some embodiments, the first mirror element 425 has a positive optical power and the imagery from the display 215 is typically focused between about 1 meter and optical infinity.

Based on the light 330, a first incident light 430 is incident on a beam splitter element 420. The beam splitter element 420 is disposed within the field of view 410 and configured to transmit a first portion 435 of the first incident light 430. In some embodiments, the beam splitter element 420 reflects 50% of first incident light 430 and transmits 50% of first incident light 430. Alternative implementations of the beam splitter element 420 may have differing percentage ratios. A second incident light 440 based on the transmitted first potion 435 (e.g., 50% of the first incident light 430) is incident upon the first mirror element 425, and a second portion 445 of the second incident light 440 is reflected off the first mirror element 425 toward the beam splitter element 420. Generally, the first mirror element 425 is 100% front surface coated to reflect substantially all of the second incident light 440. Alternative implementations of the first mirror element may have different reflectivity. A third incident light 450 based on the second portion 445 is incident upon the beam splitter element 420, and the beam splitter element 420 reflects a third portion 455 of the third incident light 450 onto the field of view 410. In some embodiments, the beam splitter element 420 reflects 50% of the third incident light 450 to the eye 415 of the viewer. Therefore, in one embodiment, approximately 25% (50% reflected of the 50% transmitted through the beam splitter) of the light power generated by the display 215 is transmitted to the eye of the viewer.

As shown, a camera 460 of the smartphone is included on an opposite surface from the display 215. The display device 400 further includes a second mirror element 470 configured to reorient a sensing axis 465 of the camera 460. In some embodiments, the camera 460 senses in the forward direction along sensing axis 475, which corresponds to an axis 412 of the field of view 410. In this orientation, the camera 460 is able to acquire visual information for the environment for performing optical detection and tracking, depth estimation, and so forth. The second mirror element 470 is illustrated as a single 90° fold mirror for simplicity; however, the mirroring arrangement for the camera 460 can be more complex including multiple mirrors and/or different mirror curvatures. In another implementation, the camera 460 of the smartphone may be included on the same surface as the display 215.

The display device 400 further includes a light-blocking assembly 480 disposed within the field of view 410. In some embodiments, the light-blocking assembly 480 comprises cross polarizers. When one or both of the cross polarizers are rotated, the amount of light from the physical environment that is transmitted to the viewer's eyes (e.g., through the beam splitter element 420) can be controlled to substantially isolate the field of view 410 from the physical environment (e.g., corresponding to a selected VR mode). Rotating the cross polarizers may be performed manually (e.g., the viewer turns a knob linked with the cross polarizers) or electronically. For example, a motor linked with the cross polarizers receives control signals from an associated computing device (such as the mobile computing device 210) and rotates the cross polarizers based on a selected AR or VR display mode. In other embodiments, the light-blocking assembly 480 includes a partially or fully transmissive "see-through" display, such as an OLED or a side-lit or naturally lit LCD. In this case, the partially or fully transmissive display receives control signals from the associated computing device and selectively darkens the display based on the selected AR or VR display mode.

Note that although the optical arrangements of FIGS. 4-11 are shown relative to a single eye 415 of the viewer, implementations of the display device 400, 500, etc. can include independent optics for each eye of the viewer. Further, in some embodiments, implementations of the display device 400, 500, etc. may include some independent optics (e.g., one per eye) and some shared optics (e.g., one for both eyes). In one example, a single beam splitter element 420 may be shared by two independent lens systems (i.e., two independent positive optical power mirrors) corresponding to the viewer's two eyes. Note additionally that alternative implementations of display device 400, 500, etc. may include one or more separate display devices (i.e., not included in the smartphone) and or one or more separate cameras (or other visual sensors). Further, the features described with respect to a particular implementation may be beneficially applied to other implementations without requiring an explicit recitation.

FIG. 5 illustrates an exemplary implementation of a compact AR/VR display device 500, according to one embodiment. Within optical arrangement 505, the first mirror element includes a flat mirror 510 instead of a curved, positive optical power mirror (as shown in FIG. 4). The optical arrangement 505 further comprises a lens element 515 disposed between the beam splitter element 420 and flat mirror 510. In some embodiments, the lens element 515 provides a positive optical power.

The imagery generated by the display 215 (represented by light 330) is incident on the beam splitter element 420, and a portion is transmitted through the beam splitter element 420 and through the lens element 515, reflected by the flat mirror 510 through the lens element 515, and a portion reflected by the beam splitter element 420 onto the field of view 410. The transmission of the imagery though the lens element 515 twice causes the optical power of the imagery to be doubled.

The optical arrangement 505 of display device 500 generally provides a reduced weight and cost. Normally, an optical power through a lens element is increased by shortening the radius of curvature of the lens, which tends to increase size, weight, and cost of the lens. As disclosed, providing two passes through the same lens element 515 provides an increased optical power without additional size, weight, and cost. Further, one non-limiting example of the lens element 515 is a Fresnel lens, which is a relatively lightweight lens compared with certain other lens implementations. Moreover, a flat mirror 510 is generally less expensive than a curved mirror.

In one alternate embodiment, the optical arrangement 505 may further include a refractive power. In this embodiment, certain optical elements included within group 520 are replaced by optical elements of group 520'. More specifically, group 520' includes a curved mirror 525 instead of the flat mirror 510, and further includes a layer 530 between the lens element 515 and the curved mirror 525. The layer 530 comprises a plastic or glass material, and has a thickness that may be selected such that the lens element 515 provides a refractive power in addition to the optical power provided by the curved mirror 525. In another embodiment, instead of two separate pieces, the curved mirror 525 may be fused (or otherwise integrally formed) with the lens element 515 to form a single refractive lens. For example, a top surface of the single refractive lens has a reflective coating, and a thickness of the plastic or glass is thicker near the center of the single refractive lens to form a positive optical power meniscus lens. One non-limiting example of a suitable single refractive lens is a Mangin mirror. The single refractive lens may be used to shorten focal length and to correct optical aberrations (such as spherical aberration) and thereby provide a higher quality image.

Figure 6:
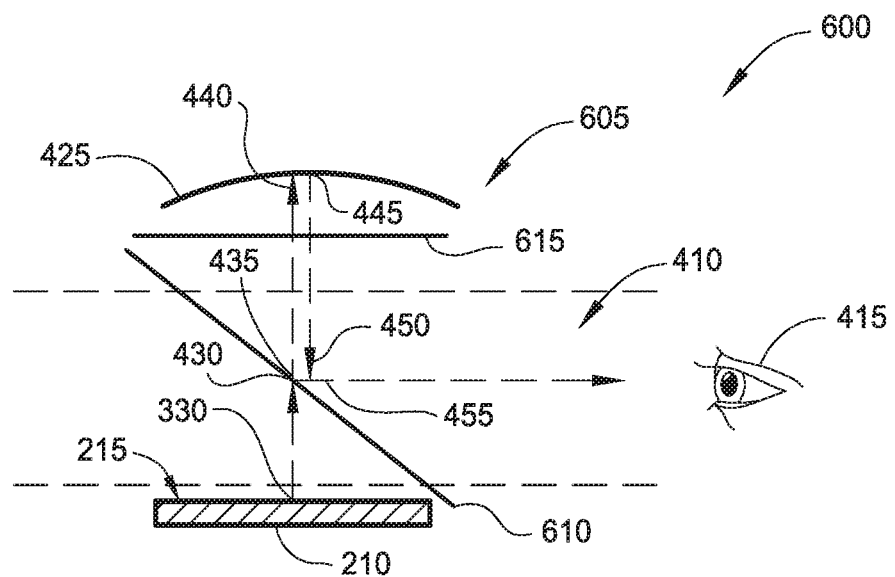

FIG. 6 illustrates an exemplary implementation of a compact AR/VR display device 600, according to one embodiment. Display device 600 generally provides greater recovery of the light 330 generated by the display 215, when compared with display device 400 shown in FIG. 4.

Within display device 600, the display 215 is a polarized display generating imagery that is linearly polarized (whether in s-polarization or p-polarization), and the beam splitter element comprises a polarizing beam splitter 610 having a polarization axis aligned with the linearly polarized light 330. Based on the linearly polarized light 330, a first incident light 430 is incident on the polarizing beam splitter 610. Because the linearly polarized light 330 from the display 215 and the polarization axis of the polarizing beam splitter 610 are aligned, the first portion 435 transmitted by the polarizing beam splitter 610 comprises a majority of the linearly polarized light 330.

The first portion 435 passes through a quarter-wave plate element 615 (or "quarter-wave retarder"), which transforms the linear polarization of the first portion 435 into a circular polarization. The circularly polarized light is incident on the first mirror element as second incident light 440, and a second portion 445 of the second incident light 440 is reflected off the first mirror element 425. The reflected light passes through the quarter-wave plate element 615, which transforms the circularly polarized light into linearly polarized light with a net 90°-rotated polarization from the polarization axis of the polarizing beam splitter 610. A third incident light 450 is incident on the polarizing beam splitter 610, and a third portion 455 is reflected onto the field of view 410 by the polarizing beam splitter 610. The third portion 455 comprises a majority of the linearly polarized third incident light 450. In this way, losses are reduced at each incidence of the light on the polarizing beam splitter 610 (transmission and subsequent reflection). In some embodiments, the amount of the linearly polarized light 330 that reaches the viewer's eye 415 can be further increased by substituting a polarized reflector for the first mirror element 425, such that a majority of the circularly-polarized second incident light 440 that is incident on the polarized reflector is reflected back (as second portion 445) through the quarter-wave plate element 615.

Figure 7:
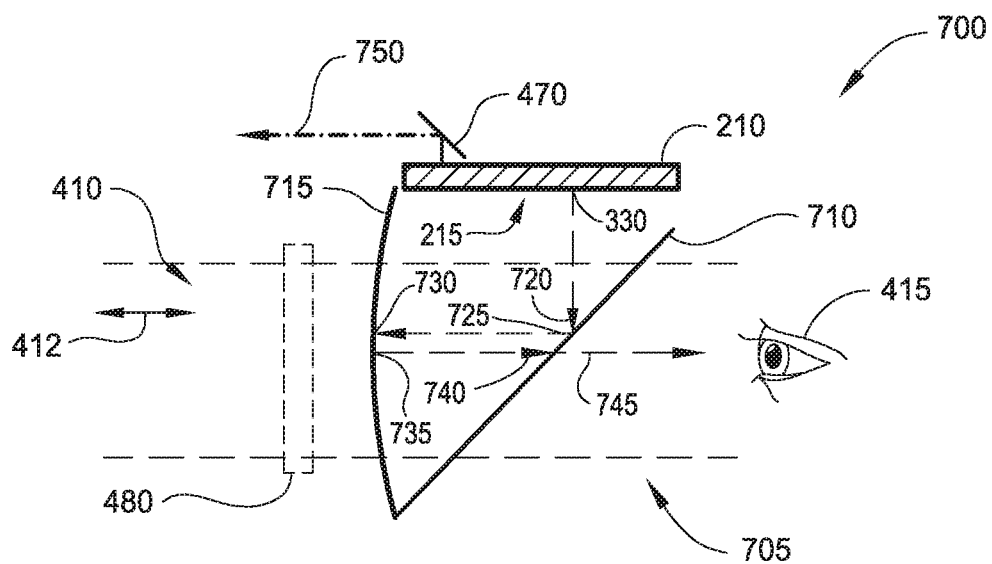

FIG. 7 illustrates an exemplary implementation of a compact AR/VR display device 700, according to one embodiment. As shown in display device 700, the display 215 is downward facing. Light 330 produced by the display 215 is transmitted in a downward direction, and first incident light 720 based on the light 330 is incident on a first mirror element 710 disposed within the field of view 410. Within display device 700, the first mirror element 710 comprises a beam splitter element. A first portion 725 of the first incident light 720 is reflected by the beam splitter element toward a second mirror element 715. The second mirror element 715 generally comprises a positive optical power see-through mirror having any suitable reflectance.

Second incident light 730 is incident on the second mirror element 715, and a second portion 735 is reflected toward the first mirror element 710. The reflected light of the second portion 735 may have a focus between about 1 meter and optical infinity. Third incident light 740 is incident on the first mirror element 710 and a third portion 745 is transmitted through the first mirror element 710 to the viewer's eye 415.

The implementation of display device 700 provides several benefits. The first mirror element 710 of the optical arrangement 705 has an orientation away from the viewer's eye 415, which generally allows a more comfortable wear or use of the display device 700. The design of display device 700 also allows the focal length of the second mirror element 715 to be significantly shorter, which reduces the overall size and weight of the optical arrangement 705. In some cases, display device 700 may be scaled to about half the size of display devices 400, 500, 600 discussed above. For example, the height of the optical arrangement 705 (as viewed, top to bottom) may be on the order of two inches. Although not shown, the optical arrangement 705 may be small enough that only a portion of the display 215 is displayed to the viewer (e.g., a portion of the display 215 extends away from the viewer and forward of the second mirror element 715.

Figure 8:
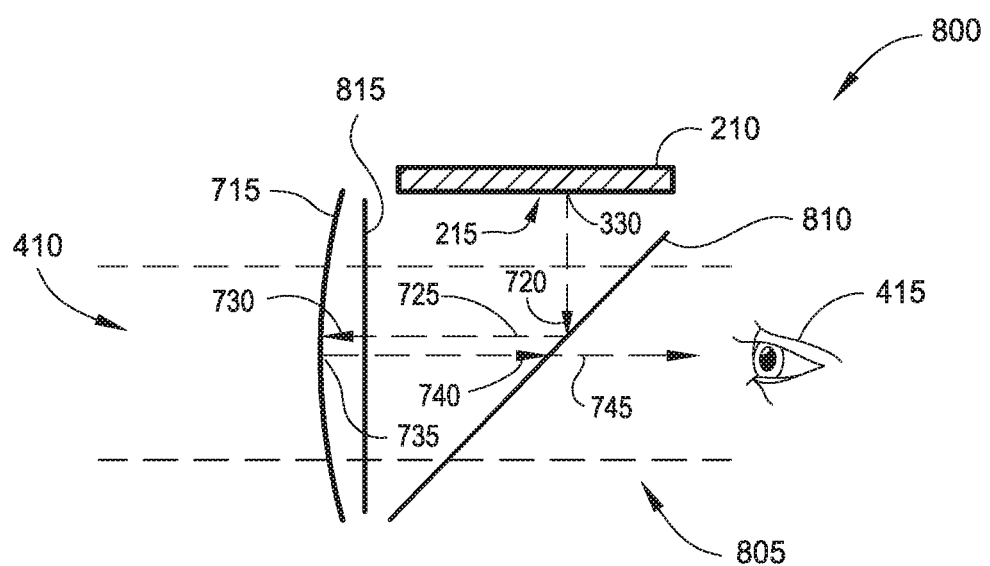

FIG. 8 illustrates an exemplary implementation of a compact AR/VR display device 800, according to one embodiment. Within display device 800, the display 215 comprises a polarized display generating imagery that is linearly polarized (whether in s-polarization or p-polarization), and the first mirror element of optical arrangement 805 comprises a polarized beam splitter element 810 having a polarization axis aligned with the linearly polarized light 330. The optical arrangement 805 further comprises a quarter-wave plate element 815 having a vertical orientation (as shown) and disposed between the polarized beam splitter element 810 and the second mirror element 715.

Within the field of view 410, the polarized beam splitter element 810 with the series combination of the quarter-wave plate element 815 and second mirror element 715 are arranged such that most of the first incident light 720 having a first polarization is reflected by the polarized beam splitter element 810 (as second portion 725), and most of the third incident light 740 having a second polarization (e.g., a 90°-rotated polarization from the polarization axis of the beam splitter element 810) is transmitted by the polarized beam splitter element 810 (as third portion 745). In this way, losses are reduced at each incidence of the light on the polarizing beam splitter element 810.

Generally, although the second mirror element 715 has a positive optical power, the second mirror element 715 does not distort or refocus the imagery as the thickness of the second mirror element 715 is consistent. In other words, the second mirror element 715 has a reflective optical power but does not have a refractive optical power. In one alternate embodiment, the second mirror element 715 is polarized in order to further increase the amount of light reflected (i.e., the second portion 735) toward the polarizing beam splitter element 810 and ultimately transmitted to the viewer.

Figure 9:
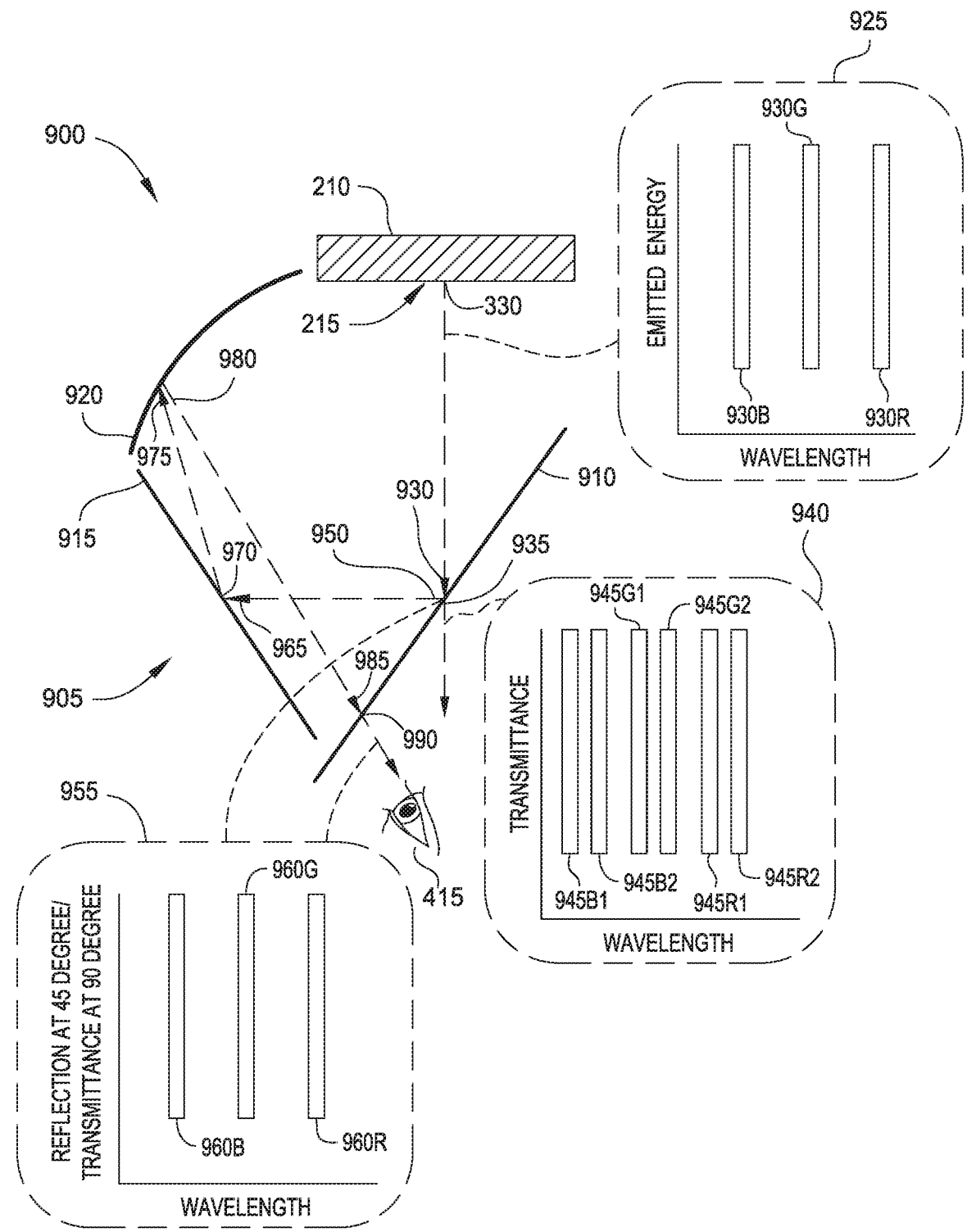

FIG. 9 illustrates an exemplary implementation of a compact AR/VR display device 900, according to one embodiment. In display device 900, the beam splitter element comprises a dichroic beam splitter 910 (or "dichroic mirror") exhibiting different transmission and/or reflection properties for different wavelengths of incident light. Furthermore, the particular spectral bandpass of the dichroic beam splitter 910 can vary based on the incidence angle of the light. In one embodiment, the light 330 generated by the display 215 includes substantially red, green, and blue (RGB) wavelengths, which is shown in chart 925 as red wavelength 930R, green wavelength 930G, and blue wavelength 930B. In this case, the dichroic beam splitter 910 comprises a triple-band dichroic mirror configured to reflect only the RGB wavelengths while transmitting substantially all other wavelengths. Other embodiments may use a dichroic beam splitter 910 using alternative color models. In some embodiments, the dichroic beam splitter 910 includes a dichroic surface (e.g., a dichroic coating) configured to reflect light at one set of wavelengths while transmitting light at other wavelengths. In one embodiment, a second mirror element 920 (e.g., a positive optical power see-through mirror) also includes a dichroic surface.

In one embodiment, first incident light 930 based on the light 330 is incident on the dichroic beam splitter 910 at a 45° angle, which provides a first type of reflectance of the light (as first portion 950). For example, the light at specific RGB wavelengths may be mostly reflected at the 45° incidence angle with the dichroic beam splitter 910, while light at other wavelengths passes through the dichroic beam splitter 910 as a transmitted portion 935. At a normal (i.e., 90°) incidence with the dichroic beam splitter 910, the light at the RGB wavelengths may be mostly transmitted through the dichroic beam splitter 910 instead of being reflected. Chart 955 illustrates these reflectance and transmittance properties of the dichroic beam splitter 910 for red wavelength 960R, green wavelength 960G, and blue wavelength 960B.

The second mirror element 920 reflects some or substantially all (e.g., depending on whether the second mirror element 920 includes the dichroic surface) of the light at the RGB wavelengths. Including a dichroic surface in the second mirror element 920 can generally provide an increased percentage of the light 330 that is passed to the eye 415 through the optical arrangement 905. In some embodiments, the dichroic surface has spectral reflectance properties that match both the emission spectrum of the display 215 and the reflection spectrum of the dichroic beam splitter 910 at a 45° incidence angle. In some embodiments, the spectral reflectance properties of the dichroic surface also match the transmission spectrum of the dichroic beam splitter 910 at a normal incidence.

A second incident light 975 is incident on the second mirror element 920, and a second portion 980 of the second incident light 975 is reflected toward the dichroic beam splitter 910. In some embodiments, a third incident light 985 based on the second portion 980 is incident on the dichroic beam splitter 910 at a 90° angle, and the light at RGB wavelengths is mostly transmitted through the dichroic beam splitter 910 as third portion 990.

Optical arrangement 905 may include additional optical element(s) to suitably orient the second incident light 975 on the second mirror element 920 such that the third incident light 985 is incident on the dichroic beam splitter 910 at substantially 90° (or alternative incidence angle that allows the RGB wavelengths to be mostly transmitted). As shown, optical arrangement 905 comprises a third mirror element 915 having a predefined arrangement relative to the dichroic beam splitter 910 and second mirror element 920. The third mirror element 915 is configured to reflect a fourth portion 970 of fourth incident light 965, where the fourth incident light 965 is based on the first portion 950 reflected by the dichroic beam splitter 910. In some embodiments, the third mirror element 915 comprises a flat mirror, and in some cases may include a dichroic surface configured to reflect only RGB wavelengths of the fourth incident light 965. The second incident light 975 incident on the second mirror element 920 is based on the fourth portion 970. Although the implementation of optical arrangement 905 may be relatively complex compared with other display devices 400, 500, etc., the use of dichroic surfaces in display device 900 generally allows better energy preservation of the light 330 generated by the display 215.

In some embodiments, the dichroic beam splitter 910 has a slight difference in the wavelengths of reflected light and the wavelengths of transmitted light. Chart 940 illustrates a first set of RGB wavelengths 945R1, 945G1, and 945B1 corresponding to reflectance of the dichroic beam splitter 910, and a second set of RGB wavelengths 945R2, 945G2, and 945B2 corresponding to a transmittance of the dichroic beam splitter 910. Such a difference can reduce color tinging effects for background light that transmits through the second mirror element 920, as the difference generally causes the viewer to visually integrate the two sets of colors and thereby reduce the perceived tinting effects.

Figure 10:
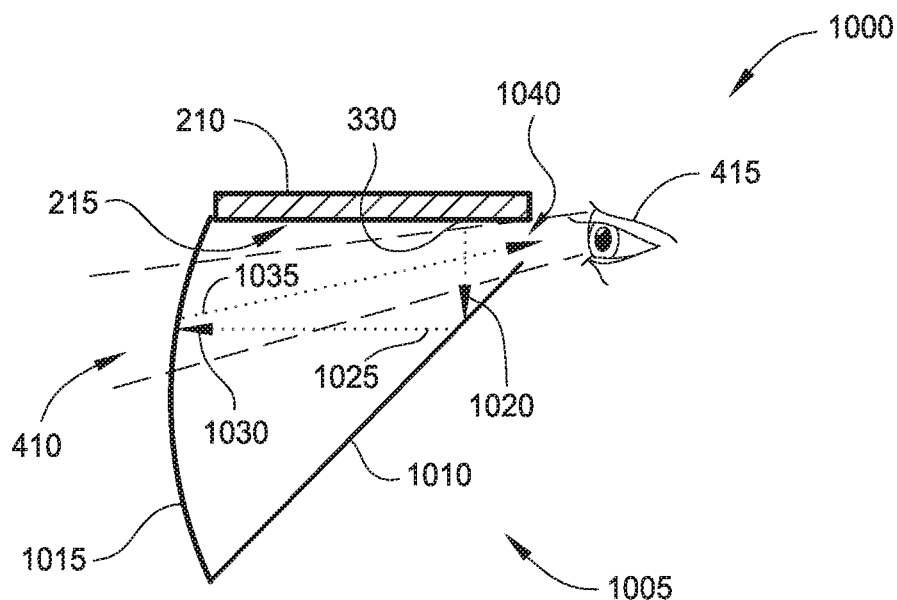

FIG. 10 illustrates an exemplary implementation of a compact AR/VR display device 1000, according to one embodiment. As discussed above, display device 400 (FIG. 4) transmits to the eye of the viewer approximately 25% of the light power produced by the display. In display device 700 (FIG. 7), which includes a positive optical power see-through mirror within the field of view, the displayed light passes through the beam splitter twice and reflects from the positive optical power see-through mirror once, which corresponds to about one-eighth (i.e., 12.5%) of the display light power being transmitted to the eye of the viewer. As a result, the imagery generated by the display and light transmitted from the physical background may appear relatively dim to the viewer.

To increase the brightness of the displayed imagery and the background light for the viewer, optical arrangement 1005 includes a first mirror element 1010 that is nearly 100% front surface mirrored instead of a beam splitter element. The optical arrangement 1005 also defines a field of view 410 with a different positioning relative to the eye 415 of the viewer. In this case, the field of view 410 extends through a separation 1040 between the display 215 and the first mirror element 1010. In one embodiment, the separation 1040 between the first mirror element 1010 and the display 215 is on the order of one-half inch to one inch.

Using the first mirror element 1010, approximately half (i.e., 50%) of the power of light 330 generated by the display 215 is transmitted to the viewer's eye 415, corresponding to a four-times (i.e., 4×) increase in brightness when compared with display device 700, while having substantially the same cost and weight. First incident light 1020 based on the light 330 is incident on the first mirror element 1010, and a first portion 1025 representing substantially all (i.e., 100%) of the light power is reflected toward the second mirror element 1015. The second mirror element 1015 generally comprises a positive optical power see-through mirror. Second incident light 1030 based on the first portion 1025 is incident on the second mirror element 1015, which reflects a second portion 1035 onto the field of view 410. In some embodiments, the second portion 1035 represents half (i.e., 50%) of the light power generated by the display 215.

In one embodiment, optical arrangement 1005 includes two of the second mirror element 1015 (i.e., two positive optical power see-through mirrors) corresponding to the viewer's two eyes. In another embodiment, optical arrangement 1005 includes a single second mirror element 1015 such that both of the viewers' eyes look at the same second mirror element 1015, which may be a less expensive implementation. Generally, implementations having a single second mirror element 1015 are suitable for providing a binocular display device (i.e., providing the same image to both eyes) with the full resolution of the full raster of the display 215, instead of splitting the display between the eyes of the viewer with the possible loss of display resolution.

Figure 11:
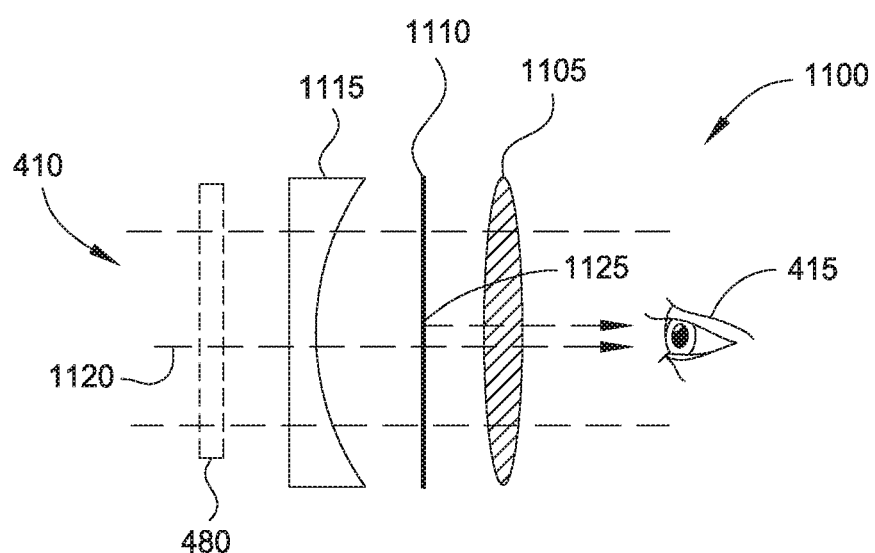

FIG. 11 illustrates an exemplary implementation of a compact AR/VR display device 1100, according to one embodiment. In display device 1100, an optically transmissive display 1110 is disposed within the field of view 410 between a first lens element 1105 and a second lens element 1115. In other words, the first lens element 1105 is disposed on a first side of the optically transmissive display 1110 and the second lens element 1115 is disposed on a second side of the optically transmissive display 1110. In some embodiments, the first lens element 1105 has a positive optical power, and the second lens element 1115 has a negative optical power that is equal in magnitude to the positive optical power. The first lens element 1105 and the second lens element 1115 may be disposed as close as possible to the optically transmissive display 1110.

The optically transmissive display 1110 is selectively transmissive of light from the physical environment. For example, each pixel of the optically transmissive display 1110 includes a clear (i.e., transmissive) portion and a reflective (or emitting) portion that permits a partial visibility through the array of pixels. Some non-limiting examples of optically transmissive display 1110 include an edge-lit LCD, a naturally-lit LCD, and transparent OLED display. In some embodiments, the optically transmissive display 1110 is a display separate from a mobile computing device (such as a smartphone). However, the processing capabilities of a smartphone may be used to drive the separate optically transmissive display 1110.

In some embodiments, the first lens element 1105 has a positive optical power for viewing the optically transmissive display 1110. The first lens element 1105 creates an image of the optically transmissive display 1110 with a focus of about 1 meter and optical infinity. However, viewing the optically transmissive display 1110 through the first lens element 1105 causes light from the physical environment to be defocused (e.g., blurs the background). Within display device 1100, the effects of the first lens element 1105 are compensated by including the second lens element 1115 having a negative optical power that is equal in magnitude to the positive optical power. The net effect of the first lens element 1105 and the second lens element 1115 is a clear view of the optically transmissive display 1110 and of the background with no optical power. In other words, the negative optical power of the second lens element 1115 corrects the light coming from the physical environment such that the environment appears undistorted to the viewer.

Advantageously, display device 1100 provides a very compact implementation. For example, the height of the optical arrangement of display device 1100 (as viewed, top to bottom) may be on the order of one-half inch to one inch. Display device 1100 may further provide a wider field of view for the viewer, as the display device 1100 can generally use shorter focal length lenses for the first lens element 1105 and the second lens element 1115. Further, display device 1100 does not require a beam splitter element to optically combine the virtual imagery 1125 provided by the optically transmissive display 1110 with the physical imagery 1120 from the environment. As a result, the display device 1100 can be arranged closer to the viewer's eye, and the implementation is generally smaller, lighter, and less expensive than implementations including a beam splitter element.

In the preceding, reference is made to embodiments of the disclosure. However, the disclosure is not limited to specific described embodiments. Instead, any combination of the preceding features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments, and advantages are merely illustrative and are not considered elements or limitations of the appended claims except where explicitly recited in a claim (s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

Additional examples of storytelling devices and story management and creation techniques, as well as proximity detection techniques and communication protocols, are provided in the attached appendices.

While the foregoing is directed to embodiments of the present disclosure, other and further embodiments of the disclosure may be devised without departing from the basic scope thereof, and the scope thereof is determined by the claims that follow.

What is claimed is:

1. An augmented reality (AR)-capable display device for displaying light generated by a display onto a field of view, the display device comprising:
    an optical arrangement having a positioning relative to a predefined position of the display and defining the field of view, the optical arrangement comprising:
        a first mirror element configured to reflect at least some display light generated by the display as first reflected display light, wherein the first mirror element comprises a dichroic beam splitter, which splits incident light based on wavelength;
        a second mirror element configured to reflect at least some of the first reflected display light reflected by the first mirror element as second reflected display light, wherein the second mirror element comprises a second dichroic surface configured to reflect red, green, and blue wavelengths; and
        a third mirror element configured to reflect at least some of the second reflected display light reflected by the second mirror element through the first mirror element and onto the field of view.

2. The display device of claim 1, wherein the dichroic beam splitter includes a first dichroic surface, wherein the second mirror element includes the second dichroic surface, wherein the third mirror element comprises a third dichroic surface having spectral reflectance properties matching a transmission spectrum of the dichroic beam splitter at normal incidence and further matching an emission spectrum of the display and a reflection spectrum of the second mirror element at a specified incidence angle, and wherein the first, second, and third dichroic surfaces permit a higher percentage of the display light in the optical arrangement to a user relative to an optical arrangement that does not include a dichroic surface.

3. The display device of claim 1, wherein the dichroic beam splitter is configured to split incident light by exhibiting different properties for different wavelengths of incident light, the different properties being of a type selected from a transmissive type or a reflective type, wherein the dichroic beam splitter has a spectral bandpass that varies based on an angle of incidence of any light that is incident on the dichroic beam splitter, wherein the dichroic beam splitter comprises a triple-band dichroic mirror configured to reflect red, green, and blue wavelengths while transmitting substantially all other visible wavelengths, and wherein the triple-band dichroic mirror is characterized by triple bands that are selected to pass wavelengths of the display light generated by the display.

4. The display device of claim 1, wherein:
    the display light comprises red, green, and blue (RGB) light, and
    the first mirror element is configured at a specified angle relative to the display such that at least some of the display light is reflected by the first mirror element as the first reflected display light.

5. The display device of claim 1, wherein:
    the third mirror element is configured to reflect the at least some of the second reflected display light reflected by the second mirror element as third reflected display light, and
    the first mirror element is configured at a specified angle relative to the third mirror element such that at least some of the third reflected display light reflected by the third mirror element is transmitted through the first mirror element.

6. The display device of claim 1, wherein the third mirror element has spectral reflectance properties that match both:
    (i) an emission spectrum of the display, and
    (ii) a reflection spectrum of the dichroic beam splitter at a first specified incidence angle of light incident on the dichroic beam splitter.

7. The display device of claim 6, wherein the third mirror element has spectral reflectance properties that match a transmission spectrum of the dichroic beam splitter at a second specified incidence angle of light incident on the dichroic beam splitter.

8. The display device of claim 1, wherein the dichroic beam splitter exhibits a difference in wavelengths of light reflected by the dichroic beam splitter and wavelengths of light transmitted by the dichroic beam splitter.

9. The display device of claim 1, wherein the third mirror element comprises a see-through mirror that transmits background light through the third mirror element and onto the field of view.

10. A method, comprising:
reflecting, using a first mirror element of a display device, at least some display light generated by a display as first reflected display light, wherein the first mirror element comprises a dichroic beam splitter, which splits incident light based on wavelength;
reflecting, using a second mirror element of the display device, at least some of the first reflected display light reflected by the first mirror element as second reflected display light, wherein the second mirror element comprises a second dichroic surface configured to reflect red, green, and blue wavelengths; and
reflecting, using a third mirror element of the display device, at least some of the second reflected display light reflected by the second mirror element through the first mirror element and onto a field of view.

11. The method of claim 10, wherein the dichroic beam splitter includes a first dichroic surface, wherein the second mirror element includes the second dichroic surface, wherein the third mirror element comprises a third dichroic surface having spectral reflectance properties matching a transmission spectrum of the dichroic beam splitter at normal incidence and further matching an emission spectrum of the display and a reflection spectrum of the second mirror element at a specified incidence angle, and wherein the first, second, and third dichroic surfaces permit a higher percentage of the display light in the display device to a user relative to a display device that does not include a dichroic surface.

12. The method of claim 10, wherein the dichroic beam splitter is configured to split incident light by exhibiting different properties for different wavelengths of incident light, the different properties being of a type selected from a transmissive type or a reflective type, wherein the dichroic beam splitter has a spectral bandpass that varies based on an angle of incidence of any light that is incident on the dichroic beam splitter, wherein the dichroic beam splitter comprises a triple-band dichroic mirror configured to reflect red, green, and blue wavelengths while transmitting substantially all other visible wavelengths, and wherein the triple-band dichroic mirror is characterized by triple bands that are selected to pass wavelengths of the display light generated by the display.

13. The method of claim 10, wherein:
the display light comprises red, green, and blue (RGB) light, and
the first mirror element is configured at a specified angle relative to the display such that at least some of the display light is reflected by the first mirror element as the first reflected display light.

14. The method of claim 10, wherein:
the third mirror element is configured to reflect the at least some of the second reflected display light reflected by the second mirror element as third reflected display light, and
the first mirror element is configured at a specified angle relative to the third mirror element such that at least some of the third reflected display light reflected by the third mirror element is transmitted through the first mirror element.

15. The method of claim 10, wherein the third mirror element has spectral reflectance properties that match both:
(i) an emission spectrum of the display, and
(ii) a reflection spectrum of the dichroic beam splitter at a first specified incidence angle of light incident on the dichroic beam splitter.

16. The method of claim 15, wherein the third mirror element has spectral reflectance properties that match a transmission spectrum of the dichroic beam splitter at a second specified incidence angle of light incident on the dichroic beam splitter.

17. The method of claim 10, wherein the dichroic beam splitter exhibits a difference in wavelengths of light reflected by the dichroic beam splitter and wavelengths of light transmitted by the dichroic beam splitter.

18. The method of claim 10, wherein the third mirror element comprises a see-through mirror that transmits background light through the third mirror element and onto the field of view.

* * * * *